Nov. 10, 1970  L. P. DUNCAN  3,538,768
MILK MEASURING DEVICE

Filed Nov. 13, 1967

INVENTOR
LLOYD P. DUNCAN
BY
Mason, Mason & Albright
ATTORNEYS

Nov. 10, 1970    L. P. DUNCAN    3,538,768
MILK MEASURING DEVICE

Filed Nov. 13, 1967    7 Sheets-Sheet 2

INVENTOR.
LLOYD P. DUNCAN
BY
Mason, Mason & Albright
ATTORNEYS

INVENTOR
LLOYD P. DUNCAN
BY
Mason, Mason & Albright
ATTORNEYS

Nov. 10, 1970     L. P. DUNCAN     3,538,768
MILK MEASURING DEVICE Filed Nov. 13, 1967     7 Sheets-Sheet 4

Fig-7

INVENTOR
LLOYD P. DUNCAN
BY
Mason, Mason & Albright
ATTORNEYS

Nov. 10, 1970     L. P. DUNCAN     3,538,768
MILK MEASURING DEVICE Filed Nov. 13, 1967     7 Sheets-Sheet 5

INVENTOR
LLOYD P. DUNCAN
BY
Mason, Mason & Albright
ATTORNEYS

Nov. 10, 1970  L. P. DUNCAN  3,538,768
MILK MEASURING DEVICE

Filed Nov. 13, 1967  7 Sheets-Sheet 6

INVENTOR
LLOYD P. DUNCAN
BY
Mason, Mason & Albright
ATTORNEYS

Nov. 10, 1970     L. P. DUNCAN     3,538,768

MILK MEASURING DEVICE

Filed Nov. 13, 1967     7 Sheets-Sheet 7

INVENTOR
LLOYD P. DUNCAN
BY
Mason, Mason & Albright
ATTORNEYS

United States Patent Office 3,538,768
Patented Nov. 10, 1970

3,538,768
MILK MEASURING DEVICE
Lloyd P. Duncan, Washington, Mo., assignor to Zero
Manufacturing Company, Washington, Mo., a corporation of Missouri
Continuation-in-part of application Ser. No. 611,415,
Jan. 24, 1967. This application Nov. 13, 1967, Ser.
No. 684,897
Int. Cl. A01j 7/00
U.S. Cl. 73—202                                                            13 Claims

ABSTRACT OF THE DISCLOSURE

A measuring device for registering the quantity of milk received from a farm animal during the milking process wherein the quantity of milk from the farm animal is measured by segregating a predetermined portion of such milk as it is conveyed from the milker to the milk pipeline.

CROSS-REFERENCES TO RELATED APPLICATIONS

This application is a continuation-in-part of application Ser. No. 611,415, filed Jan. 24, 1967, now abandoned. The device is particularly designed for combination with the milking apparatus and process disclosed in my copending applications, Serial Nos. 398,192 (now U.S. Pat. No. 3,373,720) and 495,290, filed Sept. 22, 1964, and Oct. 12, 1965, respectively, and application Ser. No. 606,770, filed Jan. 3, 1967.

BACKGROUND OF THE INVENTION

Despite the many advantages wrought by bulk milking systems and more especially by the vacuum tank bulk milking system, such systems eliminate the inherent means of measuring each farm animal's production as existed when milk from each farm animal was separately transported to the milk can. Since it is essential to good dairy farming that the production status of each animal be known, numerous devices and methods have been introduced for separately measuring each farm animal's production where a bulk milk system is used. Those which have proved practical fall in two broad classifications. First, milk is drawn from the individual farm animals into a separate receptacle where its quantity can be measured and samples can be taken for butterfat tests or the like. Second, a flow meter is placed in the milk line leading from the farm animal which records the quantity of milk which passes through it. The first method is usually cumbersome, and presents a cleaning and breakage problem. Initial cost is high due to the required calibration. Its accuracy depends either on a volumetric scale which may be obscured by foam, or upon some arrangement for weighing the milk which, unless relatively expensive may be in error. Milk flow meters currently available are expensive and are usually inaccurate. Moreover, they present a line restriction to the flow of milk. In either case, sanitation requires that the apparatus be in a clean condition prior to each milking, which with known practicable devices is accomplished by hand.

SUMMARY OF THE INVENTION

The invention provides a relatively inexpensive but effective device and method for the quantitative measurement of milk from a farm animal through means of segregating from a stream of milk, as it discharges from a milking apparatus, an accurately predetermined portion of such stream.

Invention further lies in the relationship of the main milking conduit, the milk measuring means, and of both the former and the latter to the valve means controlling the flow of milk from the milking machine so that the portion of milk received by the measuring means bears a constant relationship to the milk discharged through the main milk conduit.

Still further, invention lies in the provision for collecting a representative sample of milk from a farm animal for testing for butterfat content and other quantitative and qualitative tests.

Another object of the invention concerns the use of a float valve metering device to insure that the milk received by the measuring container bears a constant relationship to the total milk discharged.

Other objects, adaptabilities and capabilities will appear as the description progresses, reference being had to the accompanying drawings, in which:

DESCRIPTION OF THE PREFERRED EMBODIMENTS

Figure 1:
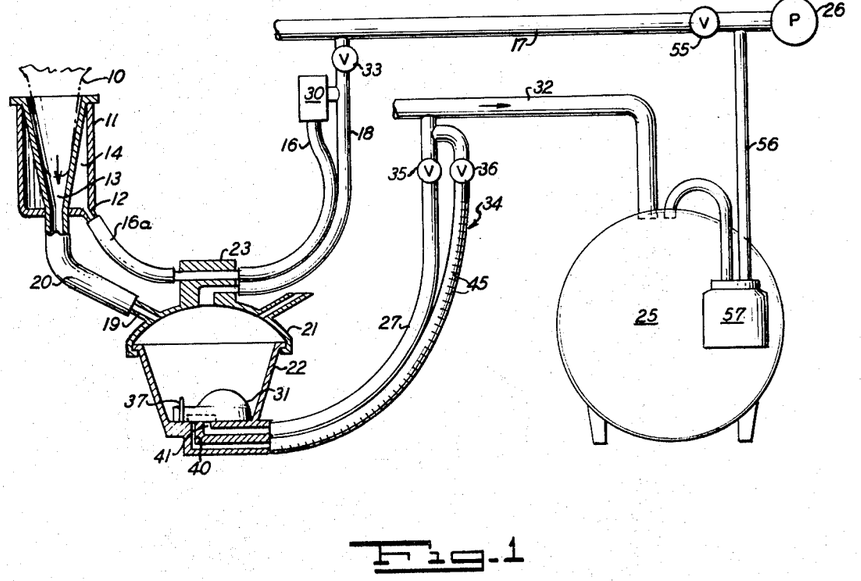
FIG. 1 is a diagrammatic representation of the invention in combination with a bulk milk vacuum tank system.

Referring now to FIG. 1, a conventional teat cup 10 is surrounded by a casing 11, and a milk channel 13 leads to a milk hose 20 wherefrom milk is received in a milk-receiving pail 22. Between the milk channel 13, which will normally be composed of a resilient material such as rubber, and the casing 11 there is an annular-shaped chamber 14 which has the air alternately evacuated therefrom by means of a pulsator 30 through pulsator conduits 16 and 16a whereby the milk channel 13 of the teat cup pulsates to massage the teat of the farm animal in a manner well known to those skilled in the art. Any suitable pulsator or teat cup may be used. The milk hose 20, which leads from milk channel 13 of each teat cup 10, connects onto nipples 19 which extend from the manifold or claw 21. The claw 21 fits on the top of the milk-receiving pail 22 in a hermetically sealed relationship whereby the degree of vacuum within such milk-receiving pail extends to the teats of the farm animal. The top of the claw 21 includes a manifold-like connection 23 which distributes the vacuum pulsations from pulsator conduit 16 to conduits 16a and also separately connects the interior of the milk-receiving pail 22 to the vacuum line 17 through the milker vacuum conduit 18 and the valve 33.

Leading from the bottom of the milk-receiving pail 22 is a main milk conduit line inlet 41 which leads to a milk conduit line 27 which in turn connects to the milk pipeline 32 through valve 35. The milk pipeline 32 leads directly into the bulk milk vacuum tank 25. A vacuum pump 26 leads into the bulk milk vacuum tank 25 via the tank vacuum line 56 and a moisture trap 57. The vacuum pump 26 also leads into the vacuum line 17 through a constant pressure regulator 55. The degree of vacuum maintained upon the vacuum line 17 and, therefore, in the milk-receiving pail 22 up to the farm animal's teats will generally be ten inches of mercury or less, whereas the degree of vacuum maintained within the bulk milk vacuum tank 25 and hence the milk pipeline 32 will generally be seventeen inches or more. Sufficient vacuum should be maintained within the milk-receiving pail 22 so that the teat cups 10 are maintained in place by the vacuum on the farm animal's teats. The degree of vacuum maintained with the bulk milk vacuum tank should be sufficient to draw milk from the main milk conduit line inlet 41 into the bulk milk vacuum tank 25 when the vacuum from vacuum line 17 is applied within the milk-receiving pail 22.

Within the milk-receiving pail 22 there is disposed a floatable valve means 31. A pair of projections 37 rising from the bottom of the milk-receiving pail 22 cooperate with notches 38 so that the valve means 31 is vertically movable. As will be noted with reference to FIG. 4, a valve seat part 42 seats over the main milk conduit line inlet 41 and at the same time over a milk-measuring inlet 40. The valve seat part 42 is made of a resilient plastic. This construction assists a quick snap-like opening and closing of the valves in the particular arrangement.

Figure 4:
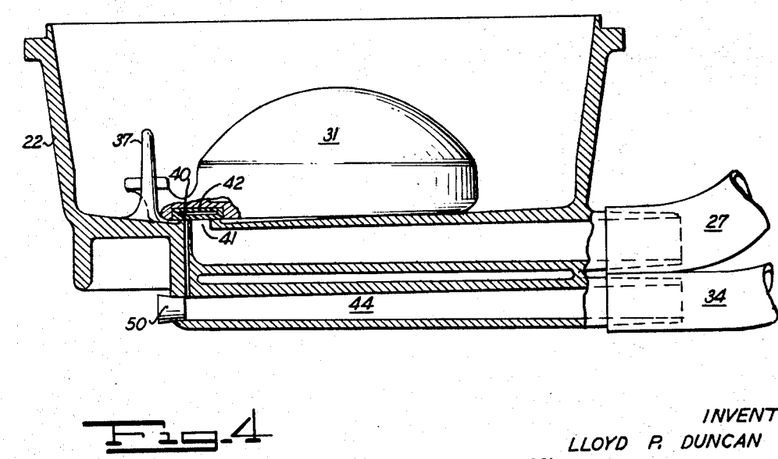
FIG. 4 is a side sectional view of the milk-receiving pail in accordance with the invention.
Figures 5, 6A:
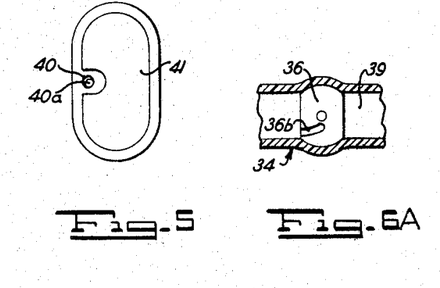
FIG. 5 is a detail view showing the milk conduit line inlet and milk measuring inlet from the milk-receiving pail.
FIGS. 6A–6E show sectional side views and top of the three-way valve connecting the milk volumetric measuring device to the upper part of the milk conduit line.

It will be noted that the main milk conduit line inlet 41 is roughly of an oval or elliptical shape. The milk-measuring inlet 40 may also be longer in one dimension than another, for example, the cross section might be one-eighth of an inch by five-thousandths of an inch. A preferable arrangement is, however, to provide a milk-measuring inlet 40 of circular bore—say one-eighth inch in diameter—with a stainless steel pin 40a inserted therein having a diameter a few thousandths less—say five thousandths—whereby milk flows into the inlet 40 around the pin 40a. This is advantageous in that the pin 40a may be withdrawn to facilitate cleaning the inlet 40. Additionally, such arrangement provides accurate metering for a wide range of producers.

Figure 2:
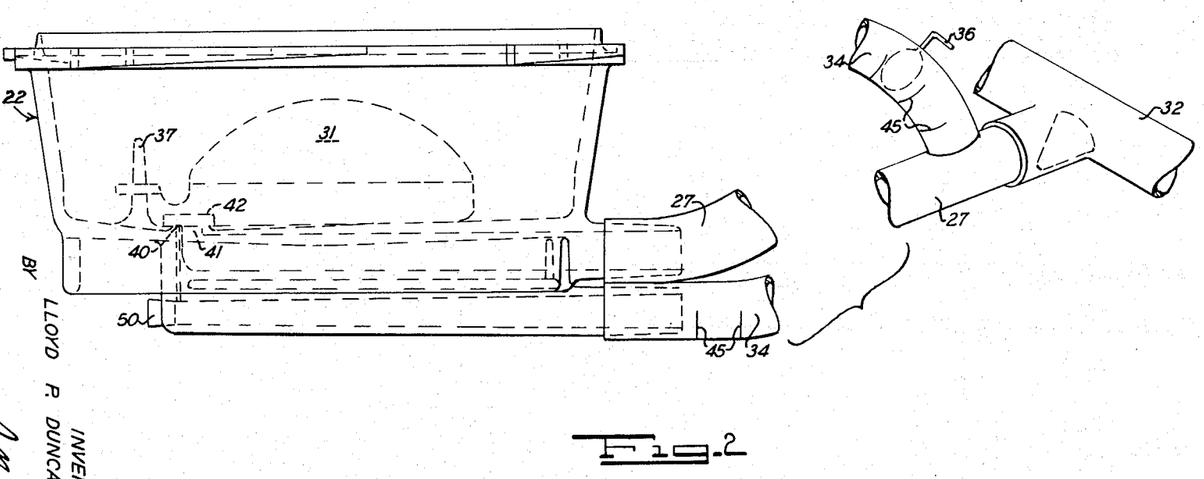
FIG. 2 is a side elevational view showing the milk-receiving pail together with the milk conduit line and the milk volumetric measuring device.
Figure 3:
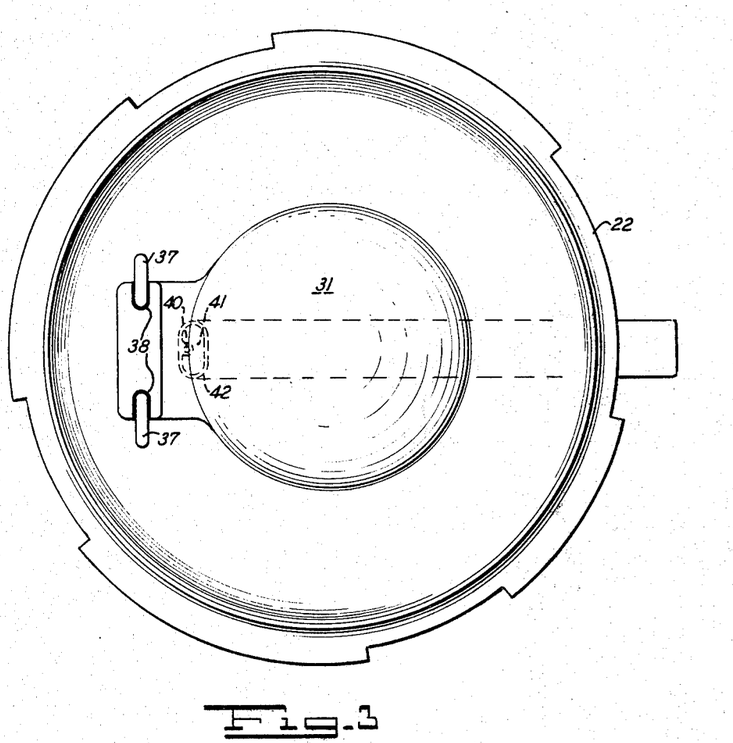
FIG. 3 is a plan view of the milk-receiving pail utilized in the invention.

The measuring device comprises the milk-measuring inlet 40, the milk volumetric measuring device 34, a three-way valve 36 and an outlet 39. The milk volumetric measuring device 34 has a series of indicia 45 which have been calibrated in accordance with the total amount of milk discharged from the milk-receiving pail 22 to show the volume of milk so discharged. From the drawings, it will be noted that the milk-measuring inlet 40 and the main milk conduit line 41 are opened and closed simultaneously by the valve means 31. In view of the connection of outlet 39 to milk pipeline 32, the pressure differential in the milk volumetric measuring device 34 bears a direct relationship to the pressure differential in the corresponding milk conduit line 27. The milk volumetric measuring device 34 is generally composed of a clear plastic which will not change significantly in dimensions for the type of temperature variations to which the device would normally be exposed. Since the milk flows to the milk conduit line 27 and to the milk volumetric measuring device 34 stop and start at exactly the same intervals, the milk received in the milk volumetric measuring device 34 bears a direct relationship to the milk conveyed through the milk conduit line 27 to the bulk milk vacuum tank 25. Thus, the milk flowing from the milk-receiving pail 22 from any one farm animal can be measured by the proportion of milk which is received by the milk volumetric measuring device 34. Also, it will be appreciated that the milk contained after a milking in the milk volumetric measuring device 34 will be a sample of the farm animal's milk during the entire milking operation—not just the initial milk or the last milk received. For this reason, after the milking operation, the milk in the milk volumetric measuring device 34 affords a fair sample of the farm animal's output for butterfat content tests and the like.

It is to be appreciated that the instantaneous flow of milk from the milk-receiving pail 22 is governed by how far the valve means 31 is opened for any given moment. Thus the instantaneous quantum of milk flowing from the milk-receiving pail 22 during a milking operation is measurable by the instantaneous registration of the restriction of valve means 31 to the milk flow from milk-receiving pail 22. In the embodiment disclosed, this registration is accomplished by the simultaneous damping and closing of inlets 40 and 41 by the valve means 31 so that the amount of milk received in the milk volumetric measuring device 34 constitutes the registration of the quanta of milk passing into both of said inlets.

Figure 6B:
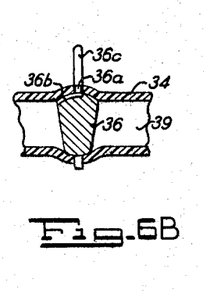
Figure 6C:
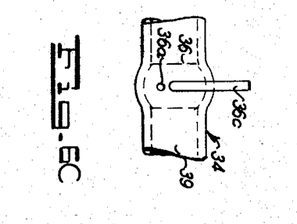
Figure 6D:
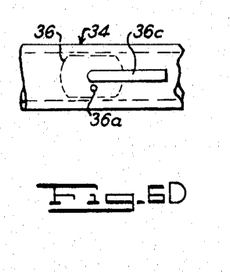
Figure 6E:
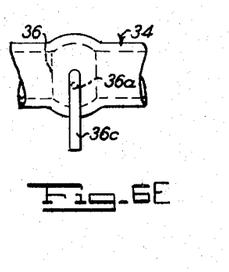
Figure 7:
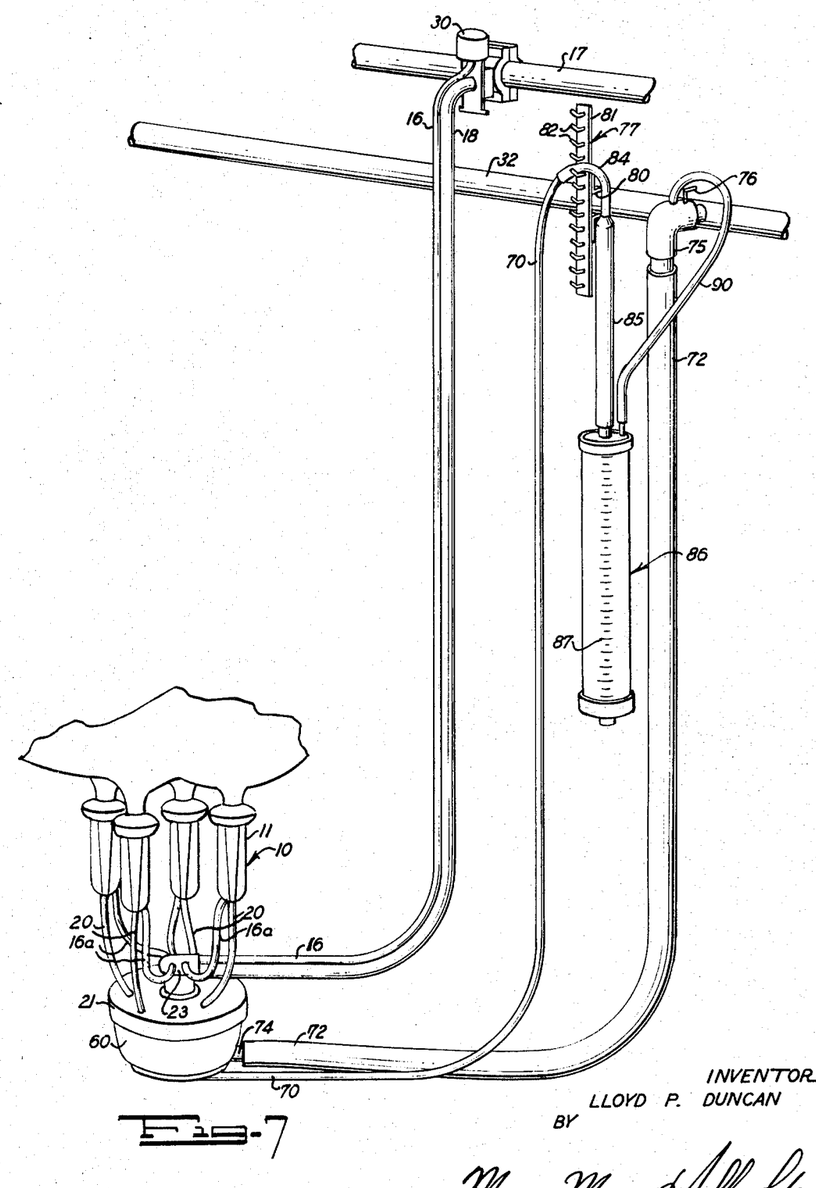
FIG. 7 is a perspective view showing a modified embodiment of the invention.
Figure 8:
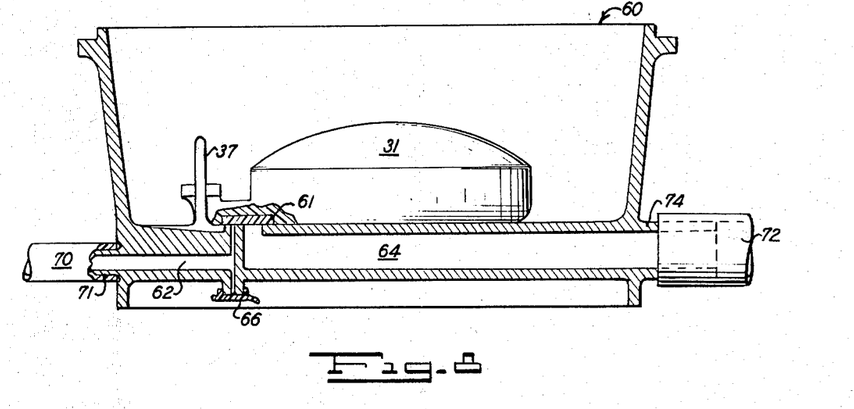
FIG. 8 is a side sectional view of a modified milk-receiving pail.

In operation in a dairy farm, teat cups 10 are applied to the teats of the farm animal and the pulsator 30 is started whereby pulsations of the milk channel 13 massage the animal's teats and milk is discharged therefrom. Such milk is conveyed through the milk channel 13 and the conduit 20 into the nipples 19 of the manifold 21 and finally to the milk receiving means comprising the milk-receiving pail 22. When sufficient milk is collected to cause the valve means 31 to float open, milk is drawn through both the main milk conduit line inlet 41 and the milk measuring inlet 40 into the milk conduit line 27 and the milk volumetric measuring device 34. Valves 35 and 36 are open (with vent 36a closed) and milk is conveyed through the milk conduit line 27 to the milk pipeline 32 and into the milk-receiving means which comprises a bulk milk vacuum tank 25 where the milk is cooled and stored. The movement of the milk is induced by the circumstance that the vacuum pump 26 produces a higher degree of vacuum in the bulk milk vacuum tank 25 than the vacuum line 17 due to the action of the constant pressure regulator valve 55. The lower vacuum communicates directly with the milk in the milk-receiving pail 22 via the manifold-like connection 23 and the milk vacuum conduit 18. This latter line additionally removes any air or other gaseous substances which might enter into the first milk-receiving means comprising the claw or manifold 21 and the milk-receiving pail 22. As the milk from the farm animal is drawn from the teats, a relatively small but substantially constant portion of such milk is drawn into the milk measuring inlet 40, and when the animal has finally been milked, the amount of milk taken from the animal will be indicated by the level of milk in the milk volumetric measuring device 34 as shown by the indicia 45. The teat cups 10 are then disconnected and the milk left within the milk volumetric measuring device 34 may, if desired, be segregated into a separate container for testing purposes by closing three-way valve 36 relative to the milk pipeline 32 and at the same time opening vent 36a, and removing closure means 50 so that milk can be drained therethrough. If this is not desired, the closure means 50 may be unseated from the milk measuring channel 44 whereby atmosphere quickly causes milk remaining in the milk volumetric measuring device 34 to be drawn into the milk pipeline 32 and the bulk milk vacuum tank 25. FIGS. 6A–6E illustrate the structure and operation of three-way valve 36 which is disposed in the outlet 39 of the volumetric measuring device 34. The vent 36a is located to the side of the opening which receives the lever stalk 36c. A groove 36b in the top of the valve 36 permits the admission of air through vent 36a into device 34 when the valve 36 is disposed as shown in FIG. 6E. However, in all other positions, such as when valve 36 is opened as shown in FIG. 6D or when oppositely closed as shown in FIG. 6C, the vent 36a is closed by the top of valve 36. As shown, the valve 36 is self-cleaning in all vital parts.

Cleaning of the measuring device may be accomplished by flushing cleaning solution and rinsing water therethrough in well-known C.I.P. (clean-in-place) arrangements.

Figure 9:
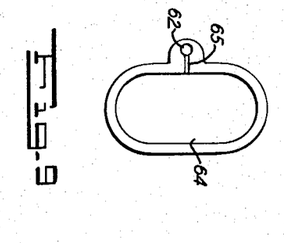
FIG. 9 is a detail view showing the milk conduit line inlet and milk measuring conduit inlet from the modified milk-receiving pail.

Referring to FIGS. 7–11, a modified embodiment is shown which permits the milking operator to adjust the measuring device for maximum accuracy. The same reference numerals have been used for similar components. In this embodiment, a milk-receiving pail 60 is designed to receive claw 21 in a hermetically sealed relationship therewith. Float valve 31 is positioned by projection 37 so that the valve seat 61 simultaneously closes over a milk-measuring inlet 62 and a main milk conduit inlet 64. As seen in FIG. 9, a groove 65 joins the inlets 62 and 64 to ensure an equalized pressure in the inlets. A closure means 66, comprising a flapper valve composed of resilient material such as rubber, is resiliently biased to close an extension which communicates with the milk-measuring inlet 62. A milk-measuring conduit 70 connects through a nipple 71 to the milk-measuring inlet 62 and the main milk conduit line 72 connects with the main milk inlet 64 through a nipple 74.

The main milk conduit line 72 connects to the milk pipeline 32 via an elbow joint 75 which includes a valve 76 adapted to open or close line 72 from pipeline 32. A head pressure adjusting attachment 77 is rigidly attached to the pipeline 32 by a clamp 80 or other suitable means. The attachment 77 comprises a vertically disposed bar 81 with a plurality of extension 82 extending normally therefrom. The milk-measuring conduit 70 includes a hook portion 84 which hangs over one of said extensions 82 selected in a manner to be described. The hook portion 84 connects with an enlarged conduit portion 85 which, in turn, leads into the milk volumetric measuring container 86 which is marked with indicia 87. A tube 90 connects the top of container 86 with elbow joint 75 just prior to the valve 76. As may be seen best in FIG. 11, a resilient ring member 91, which resiliently encircles the upper end of container 86, includes a tab 92 which is resiliently biased to close an opening 94 located in the upper end of container 86.

Figure 10:
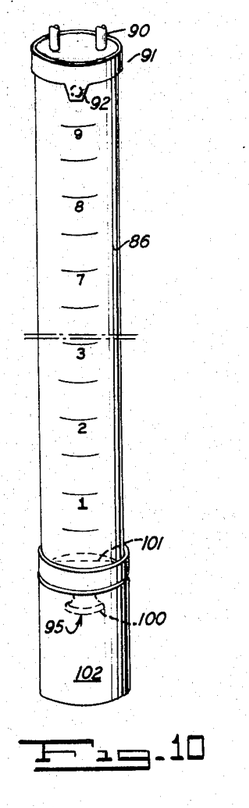
FIG. 10 is a detail view of the milk volumetric measuring container of the modified embodiment.
Figure 11:
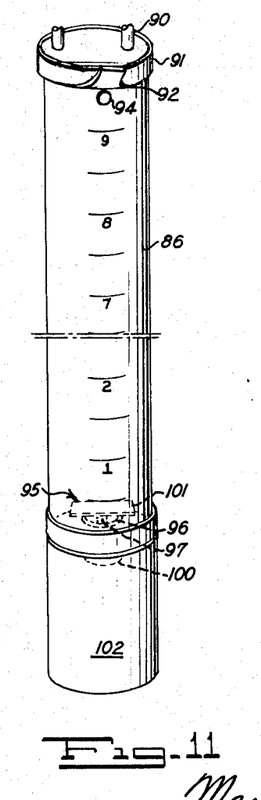
FIG. 11 is a view similar to FIG. 10 for illustrating certain operative features of the measuring container.

A valve 95 is received in an opening 96 in the lower end of the container 86. The valve 95 includes a stem 97 which connects a seat member 100 and a cross portion 101. When the inside of container 86 is under vacuum, the valve 95 is pulled upward into a closed portion so that the seat member 100 seats against the bottom of container 86 as shown in FIG. 11. However, when the pressure in the container 86 approaches or equalizes with atmospheric pressure, the valve 95 falls to the position shown in FIG. 10 and, since the cross portion does not completely cover the opening 96, is opened. The valve 95 is dimensioned to close when vacuum is applied to the interior of container 86 and to open when such vacuum is broken or when the pressure differential on both sides of the valve falls below a predetermined amount.

When the metering unit as described above is first installed, tests are run wherein known amounts of water (or preferably fresh milk, if reasonably available) are metered into the teat cups 10 to check the accuracy of the container 86. Theoretically, the container 86 should receive and indicate an amount directly proportional to that metered into the teat cups 10 when the hook portion 84 is in position to discharge into the enlarged conduit portion 85 at the same height as the milk pipeline 32. However, variances in manufacturing tolerances, line resistance, and other variables will frequently affect the accuracy of the indicia 87. In the event that the reading from indicia 87 in measuring container 86 is too high, the portion 85 may be raised to a higher extension 82 or, if too low, to a lower extension 82. In practice, the extensions 80 are identified for the percentage variations they individually may produce, and, in any event, portion 85 can be located on the particular extension 82 which gives the greatest accuracy by trial and error. Further adjustments may be made under actual operating conditions. For example, in parlor milking with each of the milking units equipped with the volumetric measuring devices of this embodiment, the total production as shown by the measuring containers 86 may be compared with the amount received in the bulk milk tank. A degree of accuracy is obtainable which more than serves its practical purpose for the dairy farmer.

In operation, the teat cups 10 are positioned on the cow's teats which establishes a vacuum of about ten inches of mercury in the pail 60 and at the teats. The valve 76, if not already opened, should be opened and the higher vacuum of about seventeen inches of mercury in pipeline 32 is communicated through line 72 (and also conduit 70) to the bottom of valve seat 61. When sufficient milk is received in pail 60 to cause float valve 31 to lift, the major portion of the milk is drawn into the main milk conduit line inlet 64 and is conveyed through line 72 to the pipeline 32 and eventually to bulk milk tank 25. A much smaller but proportional amount of milk is drawn into the milk-measuring inlet 62 and through the milk-measuring conduit 70 to the milk volumetric measuring container 86. Any siphoning action which may tend to develop in the hook portion 84 is disrupted in the enlarged conduit portion 85.

When the milking of the cow is completed, the closure means 66 is momentarily opened to admit air into conduit 70 and to clear the same of milk. A reading of the cow's milk production for the particular milking is taken from the indicia 87 and recorded. A sample cup is then placed with its opening against the bottom of container 86 as shown in FIGS. 10 and 11. Tab 92 is then momentarily lifted to uncover opening 94 and thus to reduce momentarily the vacuum in container 86 so that valve 95 commences to leak and the cup 102 is pulled tightly against the bottom of container 86 in a hermetically sealing engagement. If valve 95 does not open completely by equalization of pressure in cup 102 and container 86, this may be accomplished by momentarily uncovering opening 94 a second time. Air bubbles emitted into container 86 from cup 102 as milk drains from the container to the cup augment mixing of the milk in the container to ensure that a representative sample of milk is received in cup 102. As the milk reaches the top of cup 102, it closes the valve 95, which floats on top of the milk, and the cup 102 containing the milk sample can be readily removed from the purposes of testing by first moving it to the side slightly to break the vacuum. Milk is removed from the container 86 simply by manually lifting it above the pipeline 32 and holding it so that its milk drains through the tube 90 into the elbow joint 75.

FIGS. 12–16 disclose a further embodiment of the invention wherein the specific means for segregating a portion of the milk passing to the milk pipeline is relocated from the milk-receiving receptacle, as shown in the previous embodiments, to where the milk conduit line leading from such receptacle normally connects with the main milk pipeline. In the instant embodiment, the same reference numerals have been used for components which are similar to those heretofore described.

Figures 12, 16:
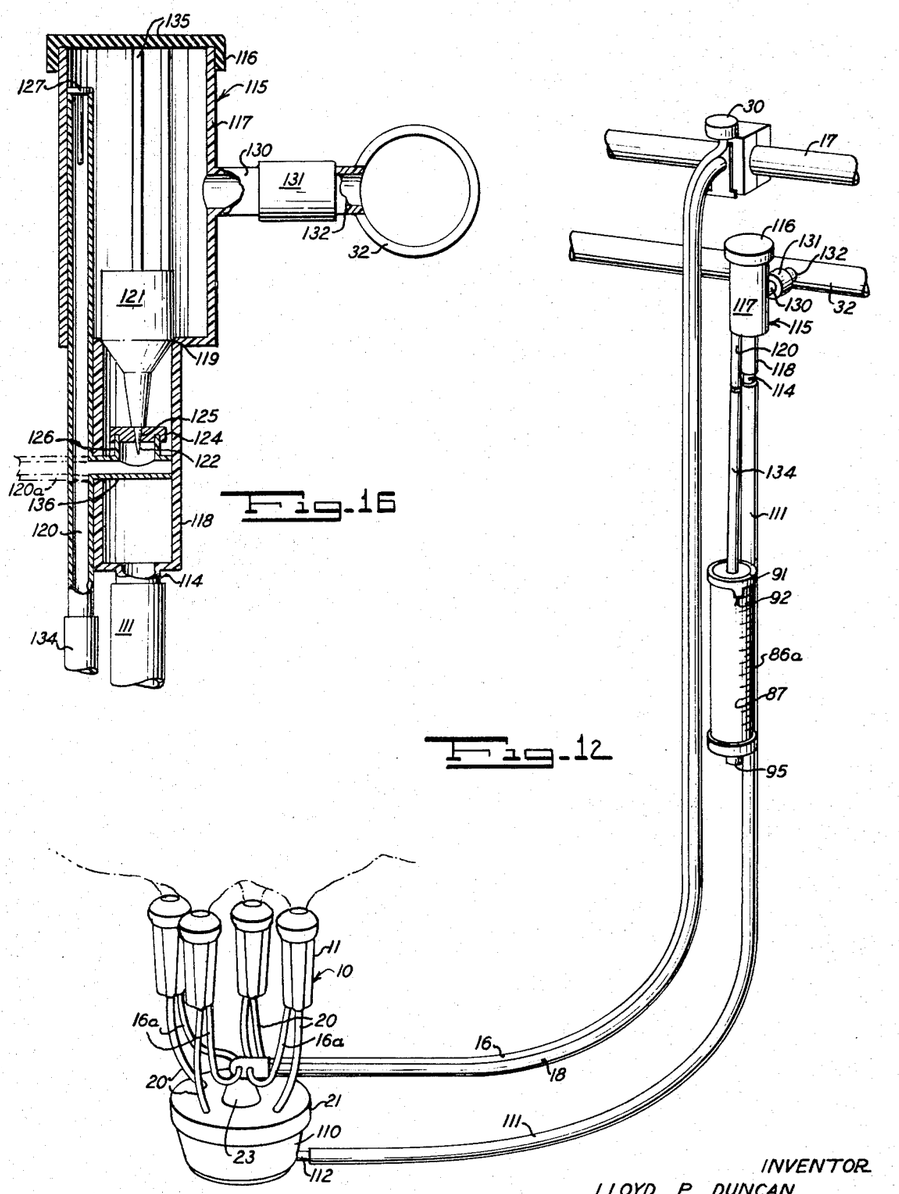
FIG. 12 is a perspective view showing a further modification of the invention.
FIG. 16 is a sectional view taken on lines 16—16 of FIG. 15 of the part shown in FIG. 14.
Figure 14:
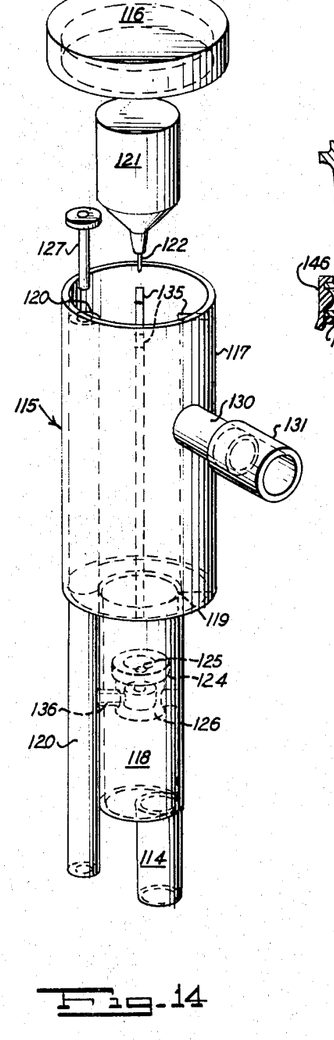
FIG. 14 is an expanded perspective view of the means for segregating a portion of the milk flowing to the milk pipeline in the further embodiment.

Referring to FIG. 12, a milk-receiving pail 110 is received by claw 21 in a hermetically sealed relationship. A milk conduit line 111, which comprises a plastic transparent tube, connects to a nipple 112 extending from the milk-receiving pail 110. At its other end, the milk conduit line 111 connects to a further nipple 114 which extends from the milk-proportioning part designated generally by reference numeral 115. As may be best seen in FIGS. 14 and 16, the milk-proportioning part 115 comprises a cap 116, an upper cylindrical portion 117, a lower cylindrical portion 118, a milk-metering tube 120, a cylinder plug 121 which carries a needle 122, a valve seat 124 having a conoidal aperture 125, a valve casing 126, and a nail-type check valve 127. A lateral nipple 130 extends normally from the upper cylindrical portion 117 and provides a passage to the milk pipeline 32 via a flexible coupling 131 and a further nipple 132 extending from the milk pipeline 32. A metered milk conduit 134 extends to the top of the container 86a, which is identical to the container 86 shown in FIGS. 10 and 11 except that it has one rather than two entrance openings at its top, the one such entrance receiving the metered milk conduit 134. Three fins 135 disposed longitudinally within the upper cylindrical portion 117 function as guides for the cylindrical plug 121. A milk-metering valve conduit 136 connects the milk-metering tube 120 with the valve casing 126. As can be seen in FIGS. 14 and 16, the milk-metering tube 120 extends parallel to portions 117 and 118 and through the bottom of the upper cylindrical portion 117 to a place proximate the cap 116 where it receives check valve 127. If desired, the part of tube 120 within the upper cylindrical portion 117 may also serve the same function as fins 135 to guide the cylinder plug 121. The connection of tube 120 to the bottom of upper portion 117 is hermetically sealed.

Figure 13:
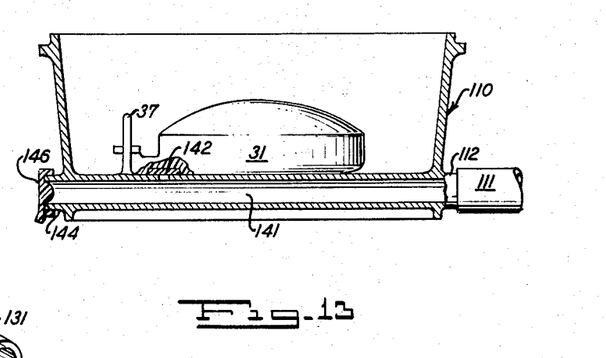
FIG. 13 is a side sectional view of the milk-receiving pail of the further modification.

The milking unit which comprises the teat cups 10, pulsator conduits 16 and 16a, milk hoses 20, claw 21, milk-receiving pail 110, connection 23, vacuum conduit 18, and milk conduit 111, may be the same as presently exists in commercially available milking units which practice the invention disclosed in the previously noted related patent applications. However, in the disclosed milk-receiving pail 110, the milk channel 141, which receives milk from pail 110 when the valve seat part 142 is raised to admit milk therein, extends under the entire pail 110 and has entrances at both ends, that is, through nipples 112 and 144, whereby cleaning of channel 141 is facilitated. A closure 146, comprising a flapper valve composed of a resilient material such as rubber, is resiliently biased to close nipple 144.

In operation, a vacuum of, say, ten inches of mercury communicates with the milk-receiving pail 110 via vacuum line 17, vacuum conduit 18 and the connection 23. A higher vacuum of, say, seventeen inches of mercury is applied to the milk pipeline 32 and communicates via the milk-proportioning part 115, line 111 and channel 141 with the valve seat part 142. Thus a lower vacuum is applied for milking the farm animal and a higher vacuum draws milk from the pail 110 into channel 142 when the float 31 is raised by milk in the pail 110. Or, more accurately, the higher absolute pressure in pail 110 causes the milk to move therefrom into the channel 142 and to the milk pipeline 32 via line 111 and milk-proportioning part 115. The milk moves from the pail 110 to pipeline 32 in essentially a solid stream.

When milking of a cow with the apparatus of the invention commences, the milk-proportioning part 115 and the container 86a are at the same degree of vacuum as the milk pipeline 32, say seventeen inches of mercury as indicated previously. If the subatmosphere in line 111 develops an absolute pressure higher than that in pipeline 32 as a column of milk is drawn into and rises in such milk conduit, such sub-atmospheric readily leaks past the cylinder plug 121 which, if necessary to permit this, rises slightly whereby the degree of vacuum in line 111 is equalized with that in pipeline 32. However, because the cylinder plug 121 is not intended to present a perfect gas seal, normal leakage is sufficient to maintain the desired vacuum in line 115. When the much more viscous column of milk rises sufficiently to encounter cylinder plug 121, the plug is raised an amount which bears a direct functional relationship to the amount of milk which flows around the cylinder plug 121 and thereafter between the fins 135 into pipeline 32 via nipples 130 and 132 and coupling 131. When at rest, the cylinder plug 121 seats at the upper periphery of the lower cylindrical portion 118 and the stainless steel needle 122 is also seated in the conoidal aperture 125 of valve seat 124, effecting, in both cases, a liquid seal. Preferably a biased valve seat 119 is provided for the cylinder plug 121 about the upper periphery of portion 118, as shown. Alternatively, the outside diameter of cylinder plug 121 may be such as to fit snugly but slidably into the interior of cylindral portion 118 so as to effect a liquid seal when closed. When the cylindrical plug rises, so does the needle 122 in the conoidal aperture 125, and a quantity of milk is drawn therethrough which bears a direct functional relationship to the distance which the needle 122 is raised. That portion of the milk which passes around te needle valve 122 into aperture 125 gravitates into the valve casing 126 and thence through conduit 136 and tube 120 to the measuring container 86a. With the size and position of the various components of the milk-proportioning part 115 and the container 86a being carefully correlated, the indicia on the container 86a shows, by reading the milk level therein, the milk production of the farm animal concerned with an accuracy which is more than satisfactory.

When the milk is completed, the milk conduit line 111 can be quickly cleared by merely opening the flapper valve 146 momentarily to admit a slug of air at atmospheric pressure.

Samples of milk for analysis purposes can be obtained as described with reference to FIGS. 10 and 11. Thereafter the remaining milk may be drained to pipeline 32 by manually raising the container 86a above the level of the pipeline 32 and momentarily opening tab 92.

The check valve 127 permits milk to be discharged into the upper cylindrical portion 117, but prevents milk or foam therein from finding its way to the milk-metering tube 120. The cylindrical plug 121 serves a similar purpose in preventing milk from backing into the line 111 and also acts as a check valve should the degree of vacuum in pipeline 32 fall below that in the line 111.

It will be appreciated by those skilled in the art that all surfaces, interior and exterior, can be cleaned manually or by automatic cleaning methods.

There are several methods to adjust the proportion of milk which flows around needle 122 to the measuring container 86a. One such method is to provide that the needle 122 is threadably received in the cylindrical plug 121 so that its extension can be adjusted by merely turning same. Another method is to provide shims between the valve seat 124 and the valve casing 126, or otherwise adjust the position of the valve seat 124.

Figure 15:
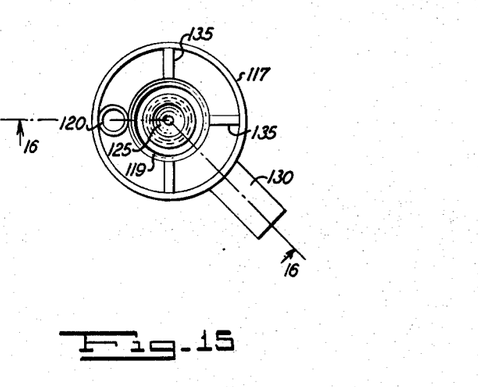
FIG. 15 is a top sectional view of the part shown in FIG. 14 without those elements shown above the part in FIG. 14.

In order to facilitate cleaning of conduit 132, the lower portion of conduit 120 may extend normally from its upper part indicated by extension 120a shown in dashed lines in FIG. 15, rather than downwardly parallel to nipple 114.

While I have described the preferred embodiments of my invention, it is to be understood that it is capable of other adaptations and modifications within the scope of the appended claims.

Having thus described my invention, what I claim as new and desire to secure by Letters Patent of the United States is:

1. In a milking system where milk moves from the milking unit to a milk pipeline in a solid stream, apparatus for measuring the quantity of milk from said milking unit during a milking operation, said apparatus comprising a body (115) which includes a connection (114) to a conduit (111) from said milking unit and a further connection (130) to said pipeline (32), said body including a first chamber (117) and a second chamber (118), said first-mentioned connection (114) receiving milk from said conduit (111) into said second chamber (118), said first chamber (117) receiving milk from said second chamber (118) and discharging milk so received to said pipeline (32), a valve (121) interposed between said chambers, said valve opening in response to the flow of milk into said second chamber to admit said milk flow into said first chamber, a measuring container (86a) connected to said body, a further valve (125) actuated by said first-mentioned valve (121) interposed between said container and said second chamber admitting to said container upon actuation by said first-mentioned valve in response to said milk flow a quantity of said milk which is proportional to said milk flow, and a pressure equalizing conduit (120) interconnecting said container with said pipeline.

2. Apparatus in accordance with claim 1 wherein said first-mentioned valve and said further valve are affixed together.

3. Apparatus in accordance with claim 1 wherein said first-mentioned valve is a check valve adapted to permit milk flow from said second chamber to said first chamber and to prevent milk flow from said first chamber to said second chamber.

4. Apparatus in accordance with claim 3 wherein said first-mentioned valve and said further valve are affixed together, said further valve comprising a needle valve.

5. Apparatus in accordance with claim 1 wherein said pressure equalizing conduit connects with said first chamber.

6. Apparatus in accordance with claim 5 wherein a check valve is disposed in said pressure equalizing conduit, said check valve preventing milk or foam from flowing into said container from said first chamber.

7. Apparatus in accordance with claim 1 wherein said first mentioned valve and said further valve are coaxial.

8. In combination with a milking machine, a milk quantity measuring device in flow communication with said milking machine which comprises valve means (31, 121), said valve means adapted to open in response to milk from said milking machine, said valve means adapted to open and close simultaneously over two openings, the first of said openings (41, 64, 118) being substantially larger relative to the second of said openings (40, 62, 125), a container (34, 86, 86a) having indicia (45, 87) thereon, a milk pipeline (32), the first of said openings communicating with said milk pipeline, the second of said openings communicating with said container, and a pressure equalizing conduit (36, 90, 120) interconnecting said container with said milk pipeline.

9. The combination of claim 8 wherein said openings are coaxial.

10. The combination of claim 9 wherein the first of said openings is disposed over the second of said openings.

11. The combination of claim 8 wherein a check valve is disposed in said pressure equalizing conduit, said check valve preventing milk or foam from flowing into said container.

12. The combination of claim 8 wherein a flexible hose interconnects said container with the second of said openings.

13. The combination of claim 12 wherein said container includes closure means for selectively admitting air therein to clear said container of milk at the end of the milking operation.

References Cited
UNITED STATES PATENTS

| | | | |
|---|---|---|---|
| 849,521 | 4/1907 | Worcester | 119—14.41 X |
| 2,718,208 | 9/1955 | Tanner | 119—14.08 |
| 3,013,431 | 12/1961 | Splettstoeser | 119—14.17 X |
| 3,102,424 | 9/1963 | Basham et al. | 73—202 |
| 3,163,047 | 12/1964 | Jaquith | 73—422 |
| 3,174,345 | 3/1965 | Bodmin | 73—422 |
| 3,187,719 | 6/1965 | Jones | 119—14.08 |
| 3,308,669 | 3/1967 | Grise et al. | 73—422 |
| 3,349,618 | 10/1967 | Maxwell | 73—202 |
| 3,373,720 | 3/1968 | Duncan | 119—14.02 |
| 2,428,350 | 10/1947 | Anderson | 119—14.54 |

HUGH R. CHAMBLEE, Primary Examiner

U.S. Cl. X.R.

73—422; 119—14.17